United States Patent [19]
Poffo

[11] Patent Number: 5,967,444
[45] Date of Patent: Oct. 19, 1999

[54] EMERGENCY HAMMER FOR BREAKING PANES OF GLASS

[75] Inventor: Hans-Joachim Poffo, Wuppertal, Germany

[73] Assignee: Happich-Fahrzeug-und Industriesteile GmbH, Wuppertal, Germany

[21] Appl. No.: 08/872,507

[22] Filed: Jun. 10, 1997

Related U.S. Application Data

[63] Continuation-in-part of application No. 08/511,695, Aug. 4, 1995, abandoned.

[30]     Foreign Application Priority Data

Aug. 9, 1994 [DE] Germany .............................. 442 8087

[51] Int. Cl.⁶ .......................... B60R 22/40; B65H 75/48; H01H 9/02; G08B 25/00
[52] U.S. Cl. ...................... 242/385.1; 242/379; 242/563; 242/912; 248/551; 200/300; 340/303
[58] Field of Search ................................ 242/379, 385.1, 242/563, 912, 397; 248/551; 200/300; 340/303

[56]     References Cited

U.S. PATENT DOCUMENTS

| | | | |
|---|---|---|---|
| 2,545,854 | 3/1951 | Levy ....................................... | 200/168 |
| 3,090,577 | 5/1963 | Lewandowski .......................... | 242/397 |
| 3,347,480 | 10/1967 | Abramoff ............................. | 242/912 X |
| 4,248,254 | 2/1981 | Trimble ............................. | 242/385.1 X |
| 5,297,357 | 3/1994 | Bigelow et al. ..................... | 242/912 X |

FOREIGN PATENT DOCUMENTS

| | | |
|---|---|---|
| 1878800 | 7/1963 | Germany . |
| 3513327 | 10/1986 | Germany . |
| 4208334 | 9/1993 | Germany . |
| 92154484 | 5/1994 | Germany . |

*Primary Examiner*—John Q. Nguyen
*Attorney, Agent, or Firm*—Harness, Dickey & Pierce, P.L.C.

[57]     ABSTRACT

An emergency hammer comprising a handle and a hammer head. A holding device fastenable to a surface and including a shaped recess on the exterior of the housing of the holding device for receiving the hammer. An anti-theft device comprising a flexible security cable extending between the hammer and a winding drum inside the housing of the holding device. The security cable being windable onto and off the drum. The security cable constructed to protect against its tearing or being cut.

13 Claims, 2 Drawing Sheets

EMERGENCY HAMMER FOR BREAKING PANES OF GLASS

CROSS-REFERENCE TO RELATED APPLICATION

This application is a continuation-in-part of U.S. application Ser. No. 08/511,695 filed Aug. 4, 1995, entitled "Emergency Hammer With Anti-Theft Device", abandoned.

BACKGROUND OF THE INVENTION

The present invention relates to an emergency hammer for breaking panes of glass. More particularly, the present invention relates to an emergency hammer that is composed of a shaft and a hammer head disposed thereon and that is supported by a holding device fastened to a wall, wherein an improved theft-prevention device connects the emergency hammer to the holding device.

An apparatus consisting of an emergency hammer and a holding device is disclosed in document DE-U 1 878 800. This emergency hammer is secured by sealed wires on the holding device against unauthorized use, misuse and theft. Experience has shown that this manner of securing emergency hammers is not sufficient for emergency hammers that are arranged in an easy to grip position by means of a holding device mounted in buses or rail vehicles.

U.S. Pat. No. 2,545,854 discloses a theft-prevention device for preventing misuse of an emergency hammer in connection with an emergency hammer for breaking a pane of glass protecting a switch of an emergency fire alarm device. The theft-prevention device connects the emergency hammer with the holding device supporting it by means of a connecting member such as a link chain. The arrangement and manner of securing represented in U.S. Pat. No. 2,545,854 is not suitable for emergency hammers intended for installation in vehicles, because these vehicles are often subject to changes in speed and direction that can cause the emergency hammer and the connecting member to oscillate. This can lead to damage to the vehicle and injuries of the occupants.

SUMMARY OF THE INVENTION

It is therefore an object of the present invention to provide an emergency hammer and a holding device with improved anti-theft properties to secure the emergency hammer in the holding device and prevent theft of the emergency hammer.

According to the present invention, an emergency hammer is provided having a hammer head mounted on a handle. A holding device for holding the emergency hammer includes a lower housing element and an upper housing element. The upper housing element has recesses and clamping strips for receiving and holding the hammer head and a part of the axial region of the handle of the emergency hammer. A cable winding drum is disposed inside the housing in a rotatably movable manner. A flexible connecting element, preferably a security cable, is attached to the cable winding drum.

The security cable preferably has a wire core sheathed in plastic. Such a cable cannot be torn apart and also cannot be cut without the employment of a special tool. In the course of possible use of the emergency hammer, the security cable can be unwound from the cable winding drum and wound back on it again later.

In a further embodiment of the invention, winding of the security cable can be made considerably easier because a spring-operated retracting unit is provided for the cable winding drum.

A particularly preferred embodiment of the invention includes a return stop for the spring-operated retracting unit. This feature assures that the security cable is not under spring tension after unwinding the security cable from the cable winding drum so that the emergency hammer can be used completely unhindered.

Additional security for the emergency hammer against theft can be realized through the use of an acoustic signal emitter coupled to the cable winding drum. A signal bell installed on the holding device or, as one alternative, a piezo-electronic signal emitter can be used.

Exemplary embodiments of the invention will be explained in detail below by reference to the drawings and accompanying detailed description.

DETAILED DESCRIPTION OF THE PREFERRED EMBODIMENTS

Figure 1:
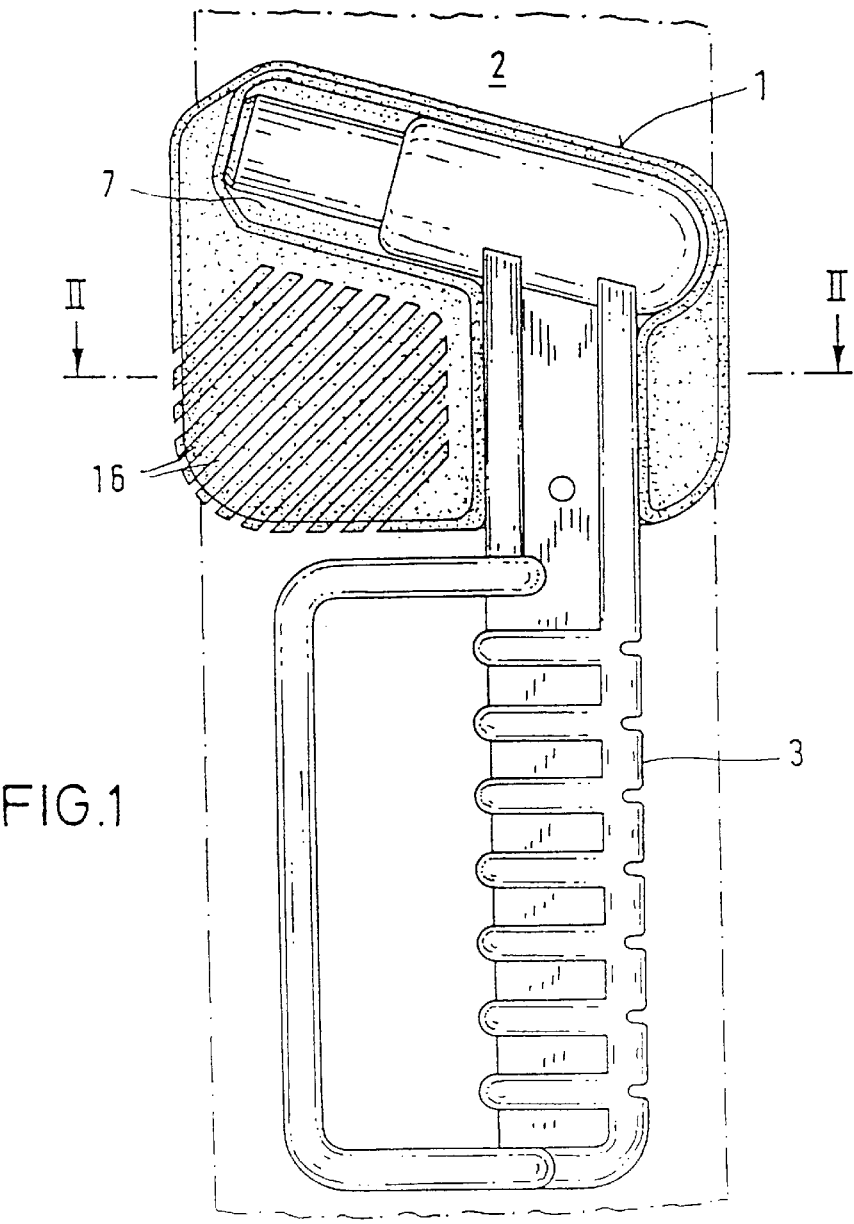
FIG. 1 shows a holding device supporting an emergency hammer and fastened on a connecting wall.
Figure 2:
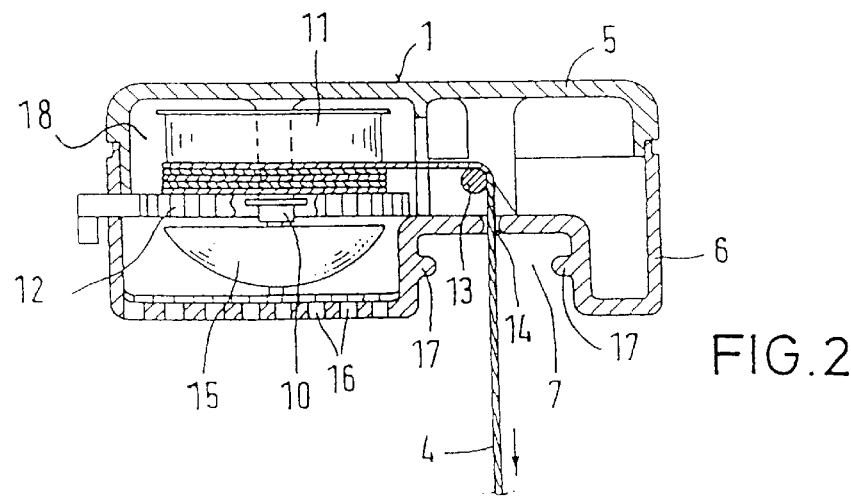
FIG. 2 is a cross-sectional view of the holding device, approximately taken along line II—II of FIG. 1.
Figure 3:
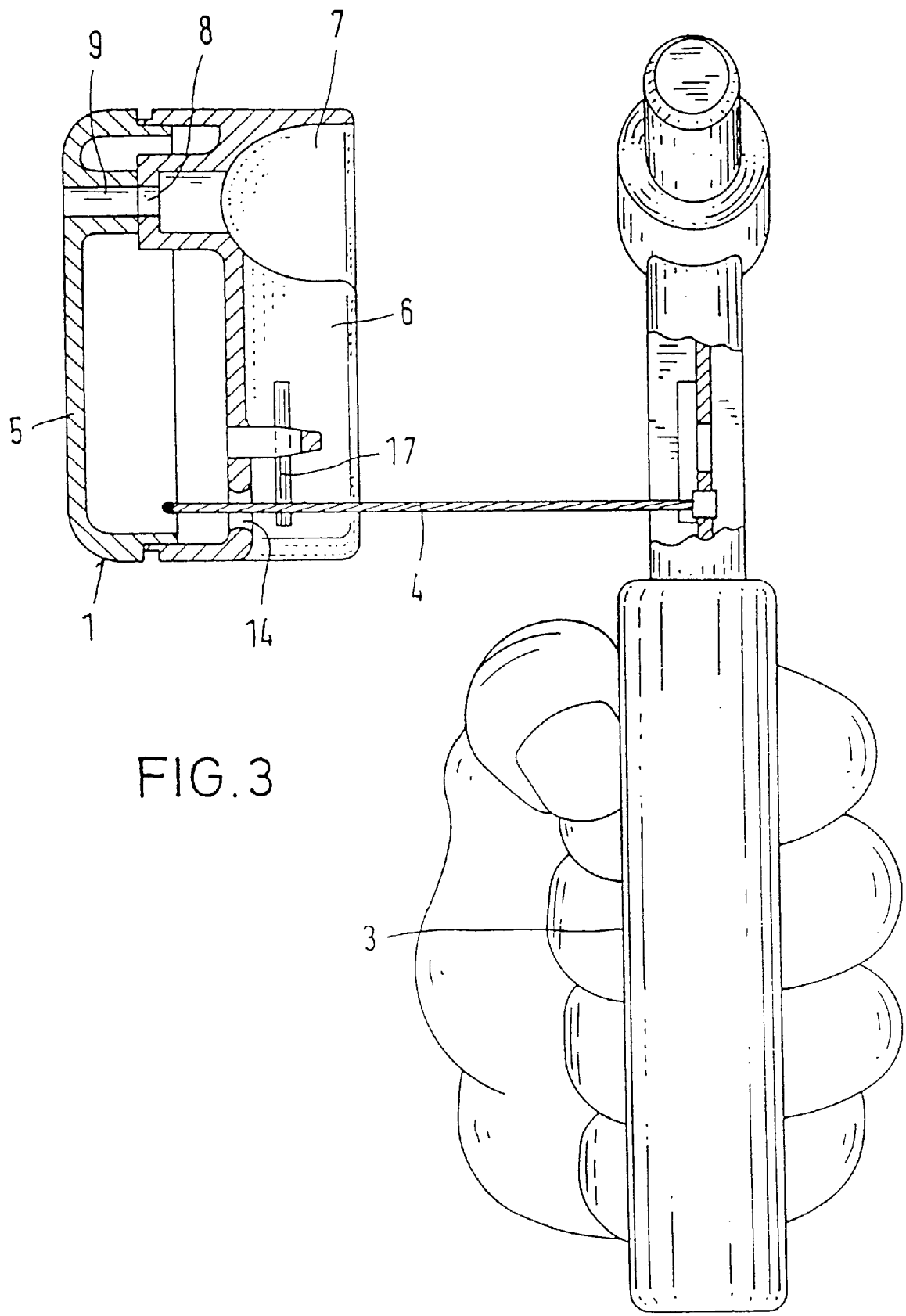
FIG. 3 shows, in vertical section, the cable connection of the emergency hammer and the holding device with the emergency hammer and holding device spaced apart from each other.

FIGS. 1 to 3 show a holding device 1, which is fastened by means of screws (not shown) to an adjoining surface such as a wall, or the window frame 2 of a bus. The holding device 1 supports an emergency hammer 3, which is preferably a hammer of the type disclosed in EP 0 134 558 B1.

The holding device is equipped with a security cable 4, whose free end is fastened on the emergency hammer 3 in a captive manner and secure against being torn off. In one embodiment, the security cable 4 may be molded on the emergency hammer 3 when the emergency hammer is manufactured.

The holding device consists of a two-piece housing with a lower housing element 5 adapted to be screwed to a connecting wall, and an upper housing element 6 designed to be fastened on the lower housing element by a clip connection. The upper housing element 6 has recesses 7 for receiving the hammer head and part of the axial area of the handle of the emergency hammer. The lower housing element 5 and the upper housing element 6 are provided with coaxially aligned bores 8 and 9 for a screw connection on an adjacent wall. The emergency hammer 3 is supported on the holding device 1 by means of clamping strips 17. In one embodiment, the clamping strips 17 may be a pair of protruding ridges integrally formed on opposite sides of the recesses 7 in the upper housing element 6.

A cable winding drum 11 with a spring-operated retracting unit, not shown in detail, and a return stop 12, also not shown in detail, are seated in a rotatably movable manner in the lower housing element 5 on a bearing journal 10 formed perpendicularly in respect to the housing bottom. These components can be designed analogously to those known from window shades (spring-loaded automatic window shade). The cable winding drum 11 on which the security cable 4 is fastened by one end contains a length of cable which, when it is in the pulled-out state, is sufficient to permit the unimpeded use of the emergency hammer 3. A deflection pin 13 and a cable opening 14 in the upper housing element 6 permit the unhindered unwinding of the cable.

Both the lower housing element 5 and the upper housing element 6 are preferably tub-shaped. When the housing elements are assembled, the hollow chamber 18 resulting therefrom may be used to hold an acoustic signal emitter such as a signal bell 15 or other type of acoustic signal emitter. Wall openings 16 in the upper housing element 6 permit the sound from the signal bell 15 to exit the housing when the emergency hammer is removed from the holding device and the security cord unwinds off of the cable winding drum.

It is intended that the foregoing detailed description be regarded as illustrative rather than limiting, and that it be understood that the following claims, including all equivalents, are intended to define the scope of this invention.

I claim:

1. An emergency device for breaking panes of glass, the emergency device comprising:

a hammer having a handle and a hammer head disposed thereon;

a holding device for supporting the hammer, the holding device adapted to be fastened on an adjacent wall, wherein the holding device comprises a lower housing element and an upper housing element defining a hollow chamber, the upper housing element having recesses and clamping strips for receiving and holding the hammer head and a part of an axial area of the handle of the hammer; and a theft-prevention device connecting the hammer with the holding device, the theft-prevention device comprising a flexible security cable attached at one end to a cable winding drum, the other end of the security cable being attached to the hammer such that the hammer and upper housing element prevent access to the security cable when the hammer is mounted in the holding device, the cable winding drum disposed inside the hollow chamber of the holding device in a rotatably movable manner, wherein the security cable has a length that permits use of the hammer and has a structure that protects it against tearing and being cut.

2. The emergency device of claim 1, wherein the security cable has a steel wire core sheathed in a plastic material.

3. The emergency device of claim 1, wherein the cable winding drum is equipped with a spring-operated retracting unit.

4. The emergency device of claim 3, further comprising a return stop for the spring-operated retracting unit.

5. The emergency device of claim 4, wherein the clamping strips are constructed integrally with the upper housing element.

6. The emergency device of claim 5, wherein the clamping strips are positioned in the recesses of the holding device.

7. The emergency device of claim 6, wherein the clamping strips releasably grip a portion of the handle positioned between the hammer head and a hand grip on the handle.

8. The emergency device of claim 1, further comprising an acoustic signal emitter coupled with the cable winding drum.

9. The emergency device of claim 1, further comprises a hand grip on the handle and a finger guard positioned over the hand grip on the handle and attached to the handle.

10. An emergency device for breaking panes of glass, the emergency device comprising:

a hammer having a handle and a hammer head disposed thereon;

a holding device for supporting the hammer, the holding device adapted to be fastened on an adjacent wall, wherein the holding device comprises a lower housing element and an upper housing element, the upper housing element having recesses and clamping strips for receiving and holding the hammer head and a part of an axial area of the handle of the hammer; and a theft-prevention device connecting the hammer with the holding device, the theft-prevention device comprising a flexible security cable attached at a first end to a cable winding drum and attached at a second end to the handle at an area between a hand grip and the hammer head, the second end of the security cable being attached to the hammer such that the hammer and upper housing element prevent access to the cable when the hammer is mounted in the holding device, the cable winding drum being disposed inside the holding device in a rotatably movable manner, and the security cable has a length that permits use of the hammer and has a structure that protects it against tearing and being cut.

11. An emergency device for breaking panes of glass, the emergency device comprising:

a hammer having a handle and a hammer head disposed thereon;

a holding device for supporting the hammer, the holding device adapted to be fastened on an adjacent wall, wherein the holding device comprises a lower housing element and an upper housing element, the upper housing element having recesses and clamping strips for receiving and holding the hammer head and a part of an axial area of the handle of the hammer; and a theft-prevention device connecting the hammer with the holding device, the theft-prevention device comprising:

a flexible security cable attached at a first end to the hammer such that the hammer and upper housing element prevent access to the security cable when the hammer is mounted in the holding device; and a cable winding drum attached to a second end of the security cable, the cable winding drum disposed inside the holding device on an axis oriented perpendicular to a wall mounting surface of the lower housing in a rotatably movable manner, wherein the security cable has a length that permits use of the hammer and has a structure that protects it against tearing and being cut.

12. The emergency device of claim 11 wherein the cable winding drum is disposed on a bearing journal, the bearing journal connected to the lower housing and oriented perpendicular to the wall mounting surface of the lower housing.

13. The emergency device of claim 12 further comprising a deflection pin mounted inside the holding device adjacent the cable winding drum, the deflection pin positioned to deflect the security cable and cooperate with the cable winding drum to permit unhindered unwinding of the security cable.

* * * * *